(12) United States Patent
Gonsalves et al.

(10) Patent No.: US 11,768,868 B2
(45) Date of Patent: Sep. 26, 2023

(54) ADAPTIVE DEEP LEARNING FOR EFFICIENT MEDIA CONTENT CREATION AND MANIPULATION

(71) Applicant: Avid Technology, Inc., Burlington, MA (US)

(72) Inventors: Robert A. Gonsalves, Wellesley, MA (US); Sam Butler, Hanley Swan (GB); Joseph S. Plazak, Quebec (CA)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 17/834,350

(22) Filed: Jun. 7, 2022

(65) Prior Publication Data

US 2022/0343170 A1    Oct. 27, 2022

Related U.S. Application Data

(63) Continuation of application No. 16/824,750, filed on Mar. 20, 2020, now Pat. No. 11,379,720.

(51) Int. Cl.
*G06F 16/45* (2019.01)
*G06N 3/08* (2023.01)
(Continued)

(52) U.S. Cl.
CPC .......... *G06F 16/45* (2019.01); *G06F 16/435* (2019.01); *G06F 18/214* (2023.01); *G06N 3/08* (2013.01);
(Continued)

(58) Field of Classification Search
CPC ...... G06F 16/45; G06F 16/435; G06F 18/214; G06V 10/56; G06V 20/46; G06V 10/82; G06V 20/41; G06V 10/774; G06N 3/08
See application file for complete search history.

(56) References Cited

U.S. PATENT DOCUMENTS

2007/0052833 A1*  3/2007  Matsui ................... G02B 13/08
                                                        348/335
2019/0087870 A1*  3/2019  Gardyne ............ H04N 21/2743
(Continued)

OTHER PUBLICATIONS

Adobe Inc. Press Release: Adobe MAX 2019: Empowering Creativity for All. Nov. 4, 2019, 3 pages.
(Continued)

*Primary Examiner* — Mishawn N. Hunter
(74) *Attorney, Agent, or Firm* — Oliver Strimpel

(57) ABSTRACT

Automatic editing of media compositions is performed using media editing applications equipped with neural-network-based deep-learning models. The automatic editing is adapted to the practices of local users of a media editing application by training the models on a combination of media compositions previously edited by third-party media editors and media compositions edited by local users. Training data input vectors for the model comprise representative portions of a composition's raw media, and corresponding output vectors include values of parameters that define editing functions applied to the raw media to generate an edited media composition. A user interface enabling a user to adjust and monitor machine learning parameters is provided. Adaptive automatic editing may assist in the creation of video and audio compositions, as well as in the generation of musical scores.

25 Claims, 9 Drawing Sheets

(51) Int. Cl.
*G06F 16/435* (2019.01)
*G06V 20/40* (2022.01)
*G06F 18/214* (2023.01)
*G06V 10/56* (2022.01)
*G06V 10/774* (2022.01)
*G06V 10/82* (2022.01)

(52) U.S. Cl.
CPC ............ *G06V 10/56* (2022.01); *G06V 10/774* (2022.01); *G06V 10/82* (2022.01); *G06V 20/41* (2022.01); *G06V 20/46* (2022.01)

(56) References Cited

U.S. PATENT DOCUMENTS

2021/0342361 A1* 11/2021 Radzewsky ............. G06F 16/23
2022/0300481 A1*  9/2022 Ahmed ................... G06F 16/48

OTHER PUBLICATIONS

Blackmagic Design Press Release: DaVinci Rasolve 16. Apr. 8, 2019, 8 pages.
Blake, et al., How to Generate Neural Network Confidence Intervals with Keras, Mediam. Sep. 3, 2019, 7 pages.
Gatys, et al., A Neural Algorithm of Artistic Style, Journal of Vision, vol. 16, No. 12, Sep. 2016, 16 pages.
Kuleshow, et al., Audio Super-resolution Using Neural Nets, Standord University, Dept. of Computer Science, Working Track ICLR, Aug. 2, 2017, 8 pages.
Nofilmschool, Watch: The Case for Hiring Robots for Film Colorists, Feb. 13, 2018, 3 pages.
Pachet et al., Sampling Variations of Sequences for Structural Music, Proceedings of the 18th ISMIR Conference, Suzhou, China, Oct. 23-27, 2017, 7 pages.
PRMac, Lemke Software Introduces Automatic Colorists for Professional Filmakers, Oct. 5, 2018, 2 pages.
Yosinski, et al., How Transferable Are Features in Deep Neural Networks?, NIPS Foundation 2014, Nov. 6, 2014, 14 pages.

* cited by examiner

ADAPTIVE DEEP LEARNING FOR EFFICIENT MEDIA CONTENT CREATION AND MANIPULATION

BACKGROUND

Media content creation tasks, such as video editing, audio mixing, and musical composition require a mixture of talents and skills. While some of these tasks require creative thinking, other parts of the media creation workflow involve little or no creativity and are often tedious and time-consuming. Some of these, especially the more repetitive and mechanical tasks, can be automated using various content creation tools, such as by using scripting methods. However, other tasks still need to be performed by humans, even when they involve relatively simple decisions. It is for these tasks, i.e., the tasks that are not purely mechanical in nature, but that do not require significant creative choices, that there exists a need to assist media content creators so that they can be freed from the time-consuming demands of such tasks.

Existing systems that use artificial intelligence (AI) methods to assist with content creation use machine learning components that were trained by the vendor and shipped as a static "black-box," with no further opportunities for learning. Such systems are inherently restricted by the scope of the training data. As a result, the performance of such systems may be adversely impacted should a user wish to apply them to content not encompassed by the training. There is, therefore, a need for increased flexibility in the tools provided to media content creators so that they can be assisted in a wider range of contexts than initially envisaged by the provider of the tools.

SUMMARY

In general, the methods described herein enable media editing applications to edit media compositions automatically by using a deep-learning neural network model. The model is adapted to users of the media editing application by training the model with a training data set that includes compositions previously edited by the users themselves.

In general, in one aspect, an automatic media editing method includes: providing a computer-implemented media editing application that is able to edit raw media automatically to generate an edited media composition, wherein: the automatic editing comprises automatically generating a value of a parameter that defines an editing function that is applied to the raw media; the automatic editing is based on a trained third-party neural network model for the editing function, wherein the third-party neural network model was trained using a third-party training data set comprising, for each media composition of a plurality of media compositions edited by one or more third-party editors: an input vector comprising representative raw media extracted from raw media that was previously edited by the one or more third-party editors; and an output vector comprising a value specified by the one or more third-party editors of the parameter defining the editing function that was applied to the raw media during the previous editing; training a user-adapted neural network model based on a combination of the third-party training data set and a user-generated training data set, wherein the user-generated training data set comprises, for each media composition of a plurality of media compositions previously edited by a user of the media editing application: an input vector comprising representative raw media extracted from raw media that was previously edited by the user; and an output vector comprising a value specified by the user of the parameter defining the editing function that was applied to the raw media during the editing by the user; and the media editing application: receiving production raw media; extracting production representative raw media from the production raw media; inputting the production representative raw media to the trained user-adaptive neural network model to generate an output value of the parameter defining the editing function to be applied to the production raw media; and applying the editing function as defined by the generated value of the parameter to the production raw media to generate a production edited media composition.

Various embodiments include one or more of the following features. The plurality of media compositions previously edited by the user of the media editing application includes a media composition for which the user specified a value of the parameter defining the editing function by adjusting a value of the parameter that was previously generated automatically by the media editing application. The production edited media composition is a video composition and the production raw media content includes a video clip. The production representative raw media comprises low resolution versions of selected frames of the video clip. The editing function comprises color correction. The raw media comprises a plurality of recordings of multiple on-set takes of spoken dialog corresponding to a script, and the editing function comprises selecting a temporal span within the raw media corresponding to an optimal on-set take. The production edited media composition is an audio composition and the representative production raw media comprises one or more short duration portions of each of a plurality of audio sources. The editing function comprises generating a rough audio mix and the parameter defining the editing function to be applied is a gain level for one of the plurality of audio sources. The editing function comprises noise reduction or equalization. The production edited media composition is a musical score; the representative production raw media comprises spatial coordinates of each of a plurality of score symbols; and the editing function comprises score layout optimization. The production edited media composition is a musical score; the representative production raw media comprises one or more musical parts of the musical score; and the editing function comprises generation of a new musical part that is harmonized to the one or more parts of the musical score. The user-generated training data set further comprises a plurality of training instances obtained from a plurality of media compositions edited by users of the media editing application other than the first-mentioned user. Generating a trained user-adapted neural network model comprises: randomly assigning each instance of the third-party training data set to one of a training data set, a validation data set, and a test data set; randomly assigning each instance of the user-generated training data set to one of the training data set, the validation data set, and the test data set; training the user-adapted neural network model with the training data set; validating the user-adapted neural network model with the validation data set; and testing the user-adapted neural network model with the test data set. Training the user-adapted neural network model comprises: weights of a given number of layers of neurons of the trained third-party neural network model to initialize weights for the given number of layers of the user-adapted neural network; randomly initializing weights of one or more layers of the user-adapted neural network model that are not initialized with weights transferred from the trained third-party neural network model; and training the user-adapted neural network model with the user-generated training data set. The transferred weights are frozen during the training. The transferred weights are adjusted during training. An integrated user interface of the media editing application for performing the editing function on a media composition includes user controls for automatic editing of the function and user controls for manual editing of the function. The representative raw media of the user-generated training data set is extracted by a training data extraction application operating in conjunction with a plug-in software module that is able to read a media composition represented by a compositional data model specific to the media editing application. The user-adapted neural network model is defined by a plurality of hyperparameters, and a user interface of a training application used to train the user-adapted neural network model enables a user of the training application to specify, for each hyperparameter of the plurality of hyperparameters whether the hyperparameter is automatically adjusted by the training application or is manually adjusted. A user interface of a training application used to train the user-adapted neural network model displays an indication of an accuracy of the automatically generated value for the parameter defining the editing function. A hyperparameter of the user-adapted neural network model is a size of the input vector comprising representative raw media extracted from raw media that was previously edited by the user. A value of the hyperparameter is automatically determined during training of the user-adapted neural network model.

In general, in another aspect, a computer program product comprises: a non-transitory computer-readable medium with computer-readable instructions encoded thereon, wherein the computer-readable instructions, when processed by a processing device instruct the processing device to perform an automatic media editing method comprising: providing a computer-implemented media editing application that is able to edit raw media automatically to generate an edited media composition, wherein: the automatic editing comprises automatically generating a value of a parameter that defines an editing function that is applied to the raw media; the automatic editing is based on a trained third-party neural network model for the editing function, wherein the third-party neural network model was trained using a third-party training data set comprising, for each media composition of a plurality of media compositions edited by one or more third-party editors: an input vector comprising representative raw media extracted from raw media that was previously edited by the one or more third-party editors; and an output vector comprising a value specified by the one or more third-party editors of the parameter defining the editing function that was applied to the raw media during the previous editing; training a user-adapted neural network model based on a combination of the third-party training data set and a user-generated training data set, wherein: the user-generated training data set comprises, for each media composition of a plurality of media compositions previously edited by a user of the media editing application: an input vector comprising representative raw media extracted from raw media that was previously edited by the user; and an output vector comprising a value specified by the user of the parameter defining the editing function that was applied to the raw media during the editing by the user; and the media editing application: receiving production raw media; extracting production representative raw media from the production raw media; inputting the production representative raw media to the trained user-adaptive neural network model to generate an output value of the parameter defining the editing function to be applied to the production raw media; and applying the editing function as defined by the generated value of the parameter to the production raw media to generate a production edited media composition.

In general, in a further aspect, a system comprises a memory for storing computer-readable instructions; and a processor connected to the memory, wherein the processor, when executing the computer-readable instructions, causes the system to perform an automatic media editing method comprising: providing a computer-implemented media editing application that is able to edit raw media automatically to generate an edited media composition, wherein: the automatic editing comprises automatically generating a value of a parameter that defines an editing function that is applied to the raw media; the automatic editing is based on a trained third-party neural network model for the editing function, wherein the third-party neural network model was trained using a third-party training data set comprising, for each media composition of a plurality of media compositions edited by one or more third-party editors: an input vector comprising representative raw media extracted from raw media that was previously edited by the one or more third-party editors; and an output vector comprising a value specified by the one or more third-party editors of the parameter defining the editing function that was applied to the raw media during the previous editing; training a user-adapted neural network model based on a combination of the third-party training data set and a user-generated training data set, wherein: user-generated training data set comprises, for each media composition of a plurality of media compositions previously edited by a user of the media editing application: an input vector comprising representative raw media extracted from raw media that was previously edited by the user; and an output vector comprising a value specified by the user of the parameter defining the editing function that was applied to the raw media during the editing by the user; and the media editing application: receiving production raw media; extracting production representative raw media from the production raw media; inputting the production representative raw media to the trained user-adaptive neural network model to generate an output value of the parameter defining the editing function to be applied to the production raw media; and applying the editing function as defined by the generated value of the parameter to the production raw media to generate a production edited media composition.

DETAILED DESCRIPTION

Figure 1:
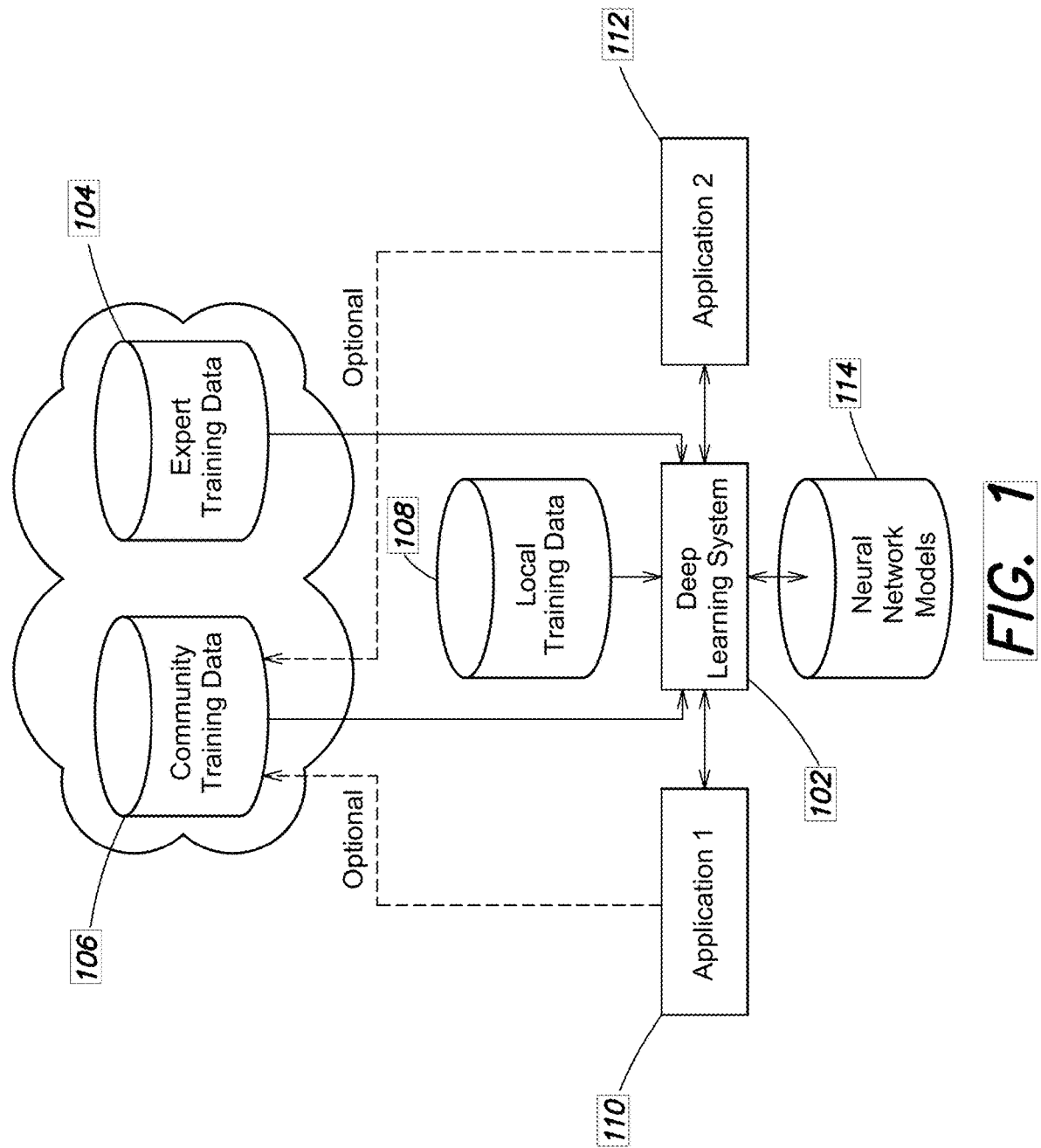
FIG. 1 is a high-level block diagram showing the major components involved in user-adaptive content creation applications based on machine learning.

The methods described herein assist media content creators and editors by automating tasks that require a level of creative input that is intermediate between fully mechanical tasks, such as exporting a video clip as a sequence of individual frames, which can be automated by means of scripting, and tasks requiring a significant amount of creativity, such as composing an original piece of music or an original screenplay. Content creation tasks are performed using one or more functions provided by an appropriate media content creation or editing application, and we accordingly refer to content creation tasks as editing functions. As mentioned in the background section above, certain existing systems are able to use machine learning methods to automate content creation functions by training a machine learning system on a corpus of decisions made by a predetermined set of media editors when creating media content. Systems are shipped to users in a fully-trained state without the possibility of additional training in the field. By contrast, we describe herein methods and systems in which a content creation application includes a machine learning component that is able to learn reliably and improve its "factory" performance by incorporating training based on past and ongoing editing decisions of one or more users. The user-generated data is used to refine or adapt a system that has been pre-trained on a user-independent body of training data.

As used herein, "user-generated" and "local" are used synonymously as they apply to training data, training data sets, compositions, and composition archives. They refer to training data and compositions generated by one or more end-users of a media editing application as opposed to third-parties who may have generated training data and compositions using the same or different media editing applications. When more than one end-user contributes to the user-generated training data the users may be part of a group that is in a single physical locality, or the group may be distributed geographically. The members of such a group may be determined by the end-users themselves or by another entity, but in either case a group of end-users are able to add their own training data and compositions to a user-generated archive to be used for model training purposes in an open-ended fashion. The terms "media content creation" and "media editing" are used interchangeably. Media content refers herein to time-based media, such as film, video, and audio, and also to musical scores.

The pre-training of adaptive AI-based media editing applications may use training data sets sourced from editors who are viewed as expert media content creators in one or more of video content, audio content, and musical score layout. The input vectors of the training data include the raw media as received by the expert editors, together with additional metadata. In general, it is desirable to provide the machine learning system with all the raw material that is available to the expert editor when editing and creating media content. The output vectors include the values of the various editing function parameters chosen by the expert editors to define their edited compositions. The parameter types depend on the type of media content creation tool being used. For example, in video content creation, the parameters may include brightness, contrast, saturation, color offsets, and curve points. For video that includes scripted material, the parameters may include the temporal offsets corresponding to the start and stop times for a portion of a particular take or audio dialog within an audio file. For audio content creation, the parameters may include gain values for each channel of the multiple channels that are combined into an audio mix. We describe specific applications of user-adaptive content creation methods below.

User-adaptive machine learning-based content creation tools include software that monitors the media content creation by a user of a media editing application, extracts data that is to be included in a local training data set and stores the extracted data. Upon user request, or on an automatic schedule, the local training data is used in conjunction with one or more third-party training data sets to retrain the machine learning system.

FIG. 1 is a high-level block diagram showing the major components involved in user-adaptive content creation applications based on machine learning. The machine learning system is described as relying on neural network models, but other approaches may be deployed to support deep learning, such as support-vector machines and random decision forests. Deep learning system 102 receives training data from one or more training data sets that have been created independently of the end-users of the media editing applications. Such data sets may include expert training data extracted from the editing of media compositions by media editors who are acknowledged to be experts with their respective content creation applications. Other training data may include community training data from a corpus of media editors in a specific community, which may have contributed their data for free use by the public. These third-party training data sets are stored on remote servers 104 and 106, which may be hosted in the cloud. In addition, the system is trained by local training data which resides on storage system 108. This data may be open-ended, in that it may be continuously augmented by ongoing media editing performed by users of media editing applications hosted on systems 110 and 112 that feature deep-learning-based content creation. Deep learning system 102 uses both the remote, third-party training data sets, as well as user-generated local training data retrieved from system 108 to train neural network models, which are stored on system 114. In some implementations, the deep learning system is pre-trained using the third-party data sets which are no longer used once a user takes delivery of the media editing applications. Additional training of the neural net models via deep learning system 102 may take place after users have worked with the applications to create their own media compositions. In some implementations, training data extracted from a user's editing may be used in conjunction with or combined with third-party training data sets, such as expert training data and community training data, as illustrated in FIG. 1. Systems 102, 108, 110, 112, and 114 may be implemented as separate systems, as indicated in FIG. 1, or they may be implemented on one or more independent systems in data communication with each other at the user's location. In common use cases, the applications are implemented on client systems at each user's location, and the local training data, deep learning system, and trained neural network models are implemented on a separate system, either on the premises of the user, or remotely.

Figure 2:
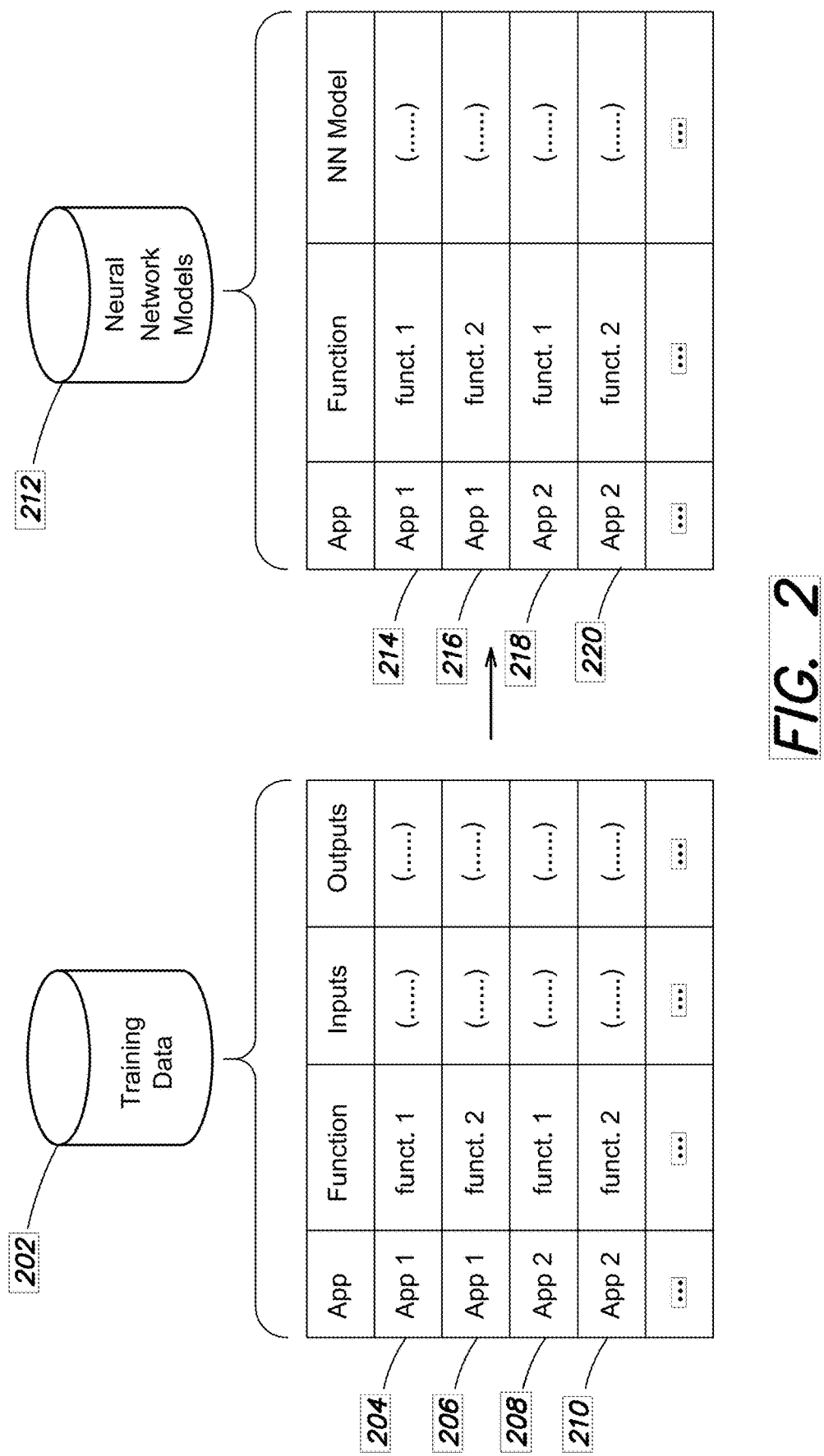
FIG. 2 is a diagram showing training data and corresponding trained neural network models for each function of each media content creation application assisted by user-adaptive machine learning.

Training data from a particular source, e.g., expert, or community, is specific to the media editing application, and to the function of that application which is being performed by the deep learning system. This is illustrated in FIG. 2, which shows composite training data set 202 comprising individual training data sets 204, 206, 208, and 210 with their own input vectors and output vectors specific to each function of each application. Each individual training data set is used to train a corresponding neural network model, as illustrated in FIG. 2 by the set of neural network models 212 comprising models 214, 216, 218, and 220, which are trained by individual training data sets 204, 206, 208, and 210 respectively. As described above in connection with FIG. 1, for third-party training data, the data may be stored remotely, while local training data may be stored on a system on the user's premises, optionally on the same system that hosts the media content creation application.

Figure 3:
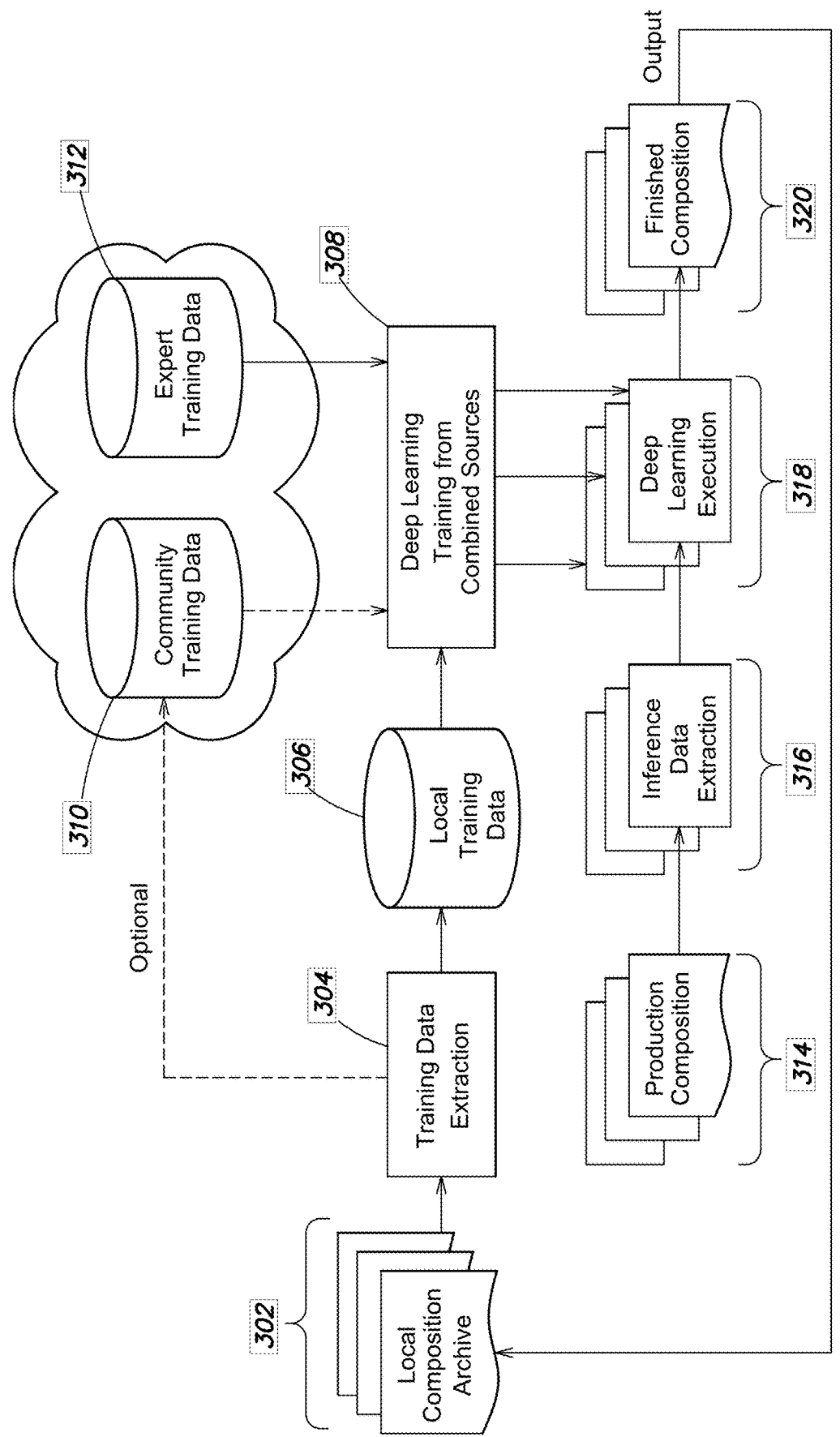
FIG. 3 illustrates a process of incorporating local training data into a system that is also trained with third-party training data.

The process of obtaining the local training data for a system that also uses third-party training data is illustrated in FIG. 3. An individual user or a set of local users creates multiple media compositions, in the process making editing decisions using a given content creation application. These decisions correspond to the user specifying the values of various editing function parameters that define the edited media composition. In one example, described in more detail below, a user of a digital audio workstation (DAW) may generate a rough mix by specifying gain values for each of a number of audio stems that are mixed together to create an audio composition. Each locally mixed audio composition, represented in a form native to the media creation application being used to create the composition, comprises the raw media input used by the composition, i.e., the audio stems in this example, and the gain value for each of the stems specified by the user. The compositions are compiled in local composition archive 302. Each composition may contain many tens or hundreds of datapoints that serve as training instances, so the number of local compositions required to supply a minimum "critical mass" for training purposes may be as low as about 10. When a sufficient number of new local compositions have been added to the archive, the user-adaptive training of the deep learning system is performed using the local training data together with one or more third-party training data sets. The training process may be activated automatically by a training system or may be performed in response to a user request. The process may be performed on the same system hosting the media creation application, optionally as a background task, or training system may be hosted on a separate machine with access to both the third-party training data sets and the local training data. The training data extraction process 304 proceeds by reading local composition archive 302, and, for each composition in the local archive, parsing the composition to identify raw media data to extract as the input vector for the composition and the compositional parameter values specified by the user to be used as the output vector. The raw media that is selected for the input vector is generally a spatially and temporally subsampled portion of the full-sized raw media. The selected data is sufficient to represent a deliberate action performed by a human user to meet an objective or subjective goal during media creation based upon the specific raw media being edited.

The data extraction process may be performed by a plug-in software module specific to a particular content creation application. The plug-in contains the information needed to read a media composition represented in native form for the application, i.e., that uses a compositional data model specific to the content creation application. The plug-in uses this information to read the native composition, identify, and extract the training data. While detailed knowledge of the compositional data model specific to a given content creation application is needed, the application itself is not required for the local training data extraction process. Thus, a plug-in with the knowledge of the specific compositional data model for a given application may be used in conjunction with a generic deep learning training application that performs the training external to the application. For media creation applications that use a proprietary compositional data model, the plug-in is generally provided by the same entity that supplies the application itself, and may operate in conjunction with the application itself, or independently of it in conjunction with a generic data extraction system. The training data extraction and model training may be performed at separate times and may use one or more third-party data sets without including user-generated data or use a combination of the third-party data and user-generated data. When deployed by an enterprise with one or more teams comprising multiple media editors within each team, the local composition archive may include compositions edited by the team members, either aggregated together for all the teams, or separately maintained to enable each team to train a different neural network model corresponding to functions being edited by the individual team. Using the same example in which a DAW user has created multiple rough mixes, the training data extraction software selects, for each rough mix, one or more audio samples from each stem of the rough mix as the input vector for that mix, and the user-specified gain parameters for each of the mix's stems as the output vector. The extracted training data is compiled in storage 306, and optionally exported to a remote training data set, such as community training data, where it may be used to augment the data set. Deep learning training system 308 inputs the local training data from storage 306 and uses a combination of third-party training data sets, such as community training data 310 and expert training data 312 and local training data 306 to train the models for each application and editing function. Methods of training models using data sourced from multiple training data sets are described below.

For each combination of a particular media content creation application and an editing function performed using the application, a separate set of local training data is compiled and used to train a model. This is illustrated in FIG. 3 with multiple instances of local composition archive 302, one for each application/function combination, each of which is used to train the corresponding model used in each of the multiple deep learning execution instances 316. During the production, or inference phase, each such trained model is used to infer an automatic edit for a given function invoked by the editor for each production composition, thus creating a corresponding finished composition 318. Once the models are trained using the combined sources, they are made available to a media content creation application, which allows automatic adaptively trained media content creation to be enabled for the application. In the inference phase, the media content creation application inputs production composition 314 and performs inference data extraction 316 using the same process for selecting representative media that was performed to extract representative media from the local composition archive in step 304. Using the extracted data as input to its user-adapted trained model and executing the deep learning process 318, the media composition application automatically edits the production composition to generate finished composition 320, which may then be delivered to its intended recipient and/or sent to storage. The finished composition may also be added to local composition archive 302 to augment the local training data.

Figure 4:
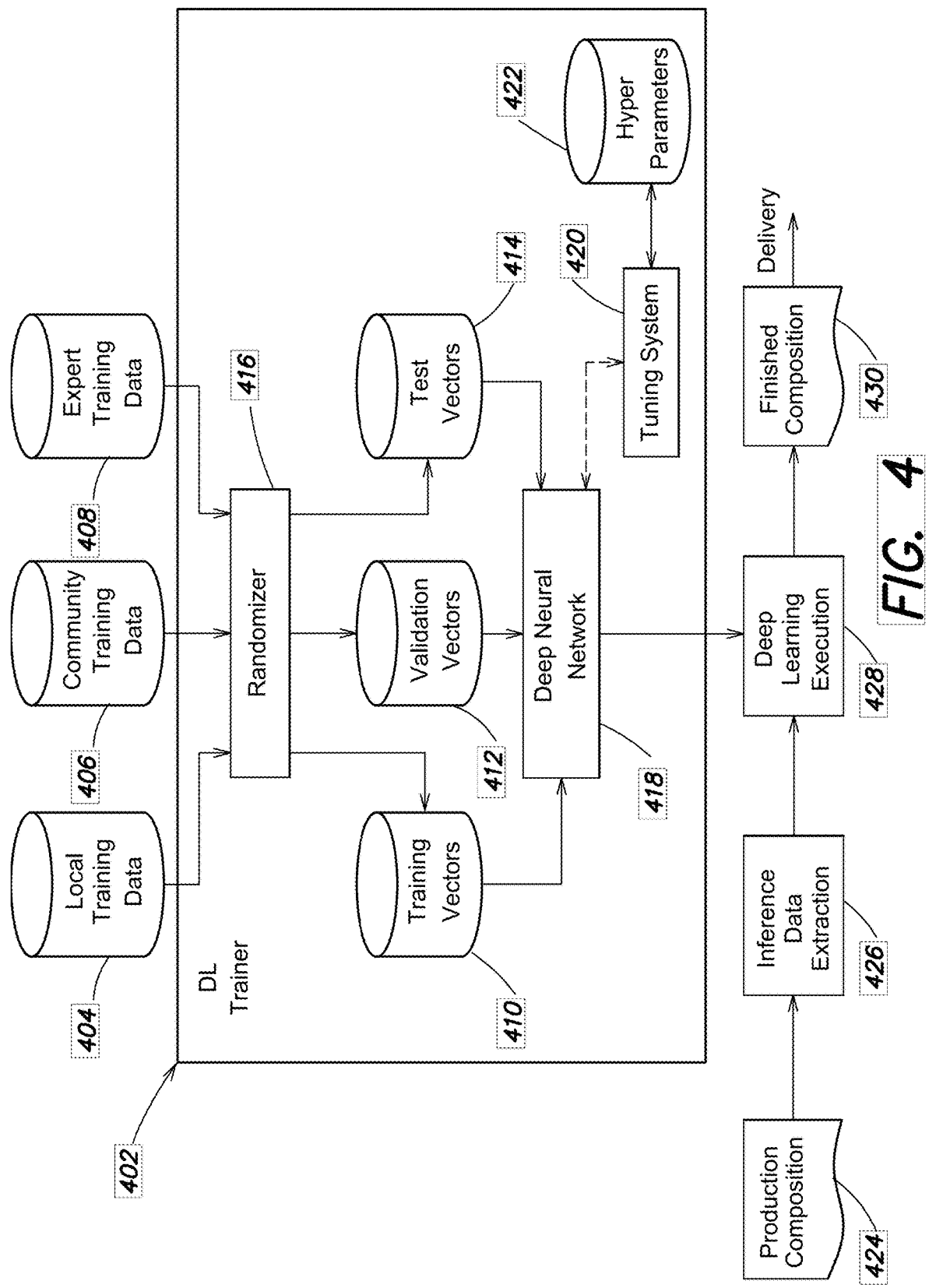
FIG. 4 is a high-level block diagram illustrating a deep learning-based content creation system in which randomization is used to combine local training data with third-party training data.

Various methods may be used when combining multiple training data sets to train deep learning models, including but not limited to randomization and transfer learning. FIG. 4 is a high-level block diagram illustrating an implementation in which randomization is used to combine the multiple training data sets. Deep learning training application 402 imports local training data 404, and one or more third-party training data sets, such as community training data 406 and expert training data 408. In this implementation, the multiple training data sets, including local training data, are randomly assigned to serve as training vectors 410, validation vectors 412, or test vectors 414 by randomizer 416. Thus, the training vectors, the validation vectors, and the test vectors each include instances sourced from all three of the training data sets.

In some implementations, transfer learning is used to combine the training data. The techniques of transfer learning are described in a publication entitled "How Transferable Are Features in Deep Neural Networks" by Yosinski et al., in Advances in Neural Information Processing Systems 27 (NIPS '14), NIPS Foundation, 2014, which is wholly incorporated herein by reference. The neural network model is first trained using one or more third-party training data sets, and the learned features of the model are transferred to a second model which is trained using the local training data. Combining the third-party training data with local data by transfer learning may be desirable when aspects of the automatic content creation functions are general, i.e., suitable for both the third-party editing functions and the local user editing functions. One transfer learning method involves training the base neural network with the third-party training data and copying its first n layers (i.e., the n neuron layers closest to the inputs) to the first n neuron layers of the target network. Each of the layers comprises a set of neurons with an assigned weight, the number of neurons being commonly referred to as the width of the layer. The remaining layers of the target network are then randomly initialized and trained by the local training data so as to adapt to the content creation style and preferences of the one or more local operators. The errors derived from the local training data may be back-propagated into the features derived from the third-party training data, i.e., to the transferred first n layers of the model for fine-tuning, or the transferred feature layers may be left frozen so that they do not change during the training with the local data.

The randomization method of combining training data produces more accurate results since the model is entirely retrained by the latest available data set combination. However, transfer learning may be less compute-intensive and thus preferred in situations where rapid training is desired. Transfer learning may also be effective in making effective use of local training data when the amount of local data is heavily outweighed by third-party training data, since the retraining of "unfrozen" layers of the network is based purely on the local data. The retrained layers include one or more of the input layers, i.e., the layer that receives the inputs and one or more layers adjacent to it, and, in some cases, one or more of the output layers. If the third-party data is comprehensive such that it encompasses most of the possible outcomes, the output layers do not require retraining. However, when there is only a small amount of expert data, or if the expert data does not use many of the possible outcomes, then one or more of the output layers is retrained. Retraining of the one or more input layers has an immediate effect in adapting the neural network to the local data.

The training sequence proceeds by using training vectors 410 to train neural network model 418. Test vectors 414 are then used to test the accuracy of the system. If the results of the training are not acceptable, validation vectors 412 are run multiple times while varying the model's hyperparameter values. The hyperparameter values that result in maximal accuracy of the results for validation data set 412 are then applied to the model, which is re-evaluated with the test vectors. If the model still exhibits an unacceptably high error rate, e.g., more than 5%, (i.e., less than 95% accuracy), the training, testing, validation, hyperparameter tuning, and re-testing is repeated until an acceptable error rate is achieved. The tuning of hyperparameters may be performed automatically by tuning system 420 which accesses database of hyperparameters 422, which contains current values of each applicable hyperparameter, both those that are fixed, and those that may change as a result of training and optimization at the user's site. Tuning system 420 refers to hyperparameter database 422 to read existing values, both for fixed and variable hyperparameters and writes new values into the database following an automatic tuning cycle. If the user performs manual hyperparameter tuning, the user-specified value is also written to the database, replacing the previous value. Using the rough audio mix example again, the duration of an input (raw media) audio sample may be fixed, and the mini-batch size may be varied. The criteria that determine an acceptable error rate are specific to each application and function for which the deep learning system is trained and are discussed below in connection with the exemplary application/function models. Once an acceptable accuracy is achieved for the neural network-based model, it is made available for production use of the applicable media content creation application. FIG. 4 illustrates the use of an adaptively trained application in production, with production composition (e.g., raw media) 424 being automatically processed by inference data extraction 426 and deep learning execution system 428, which outputs finished composition 430.

In some systems, the training may get stuck in a local optimization of the accuracy. Manual adjustment of hyperparameters may override the training so that the system is able to reach a global optimization of the accuracy. When the local training data represent scenarios that were not present in the third-party training data, the user may wish to treat the additional scenarios as additional special cases without degrading or relearning the knowledge derived from the pre-training with third-party training data. This may be accommodated by increasing the complexity of the model. Alternatively, the user may wish to retrain the neural network model by diluting or re-learning previously trained aspects, so that as the volume of the local training data grows, it increasingly dominates the behavior of the deep learning system, eventually overriding the third-party training data. While new local data is being added, the accuracy of the system may degrade when the system transitions from treating a small number of new scenarios from the local training data as outliers to treating them as the norm. Such degradation does not occur when the local training data is aligned with the third-party data, since the local data reinforces the pre-training, and the outputs of the system are not greatly changed by the local training.

Figure 5:
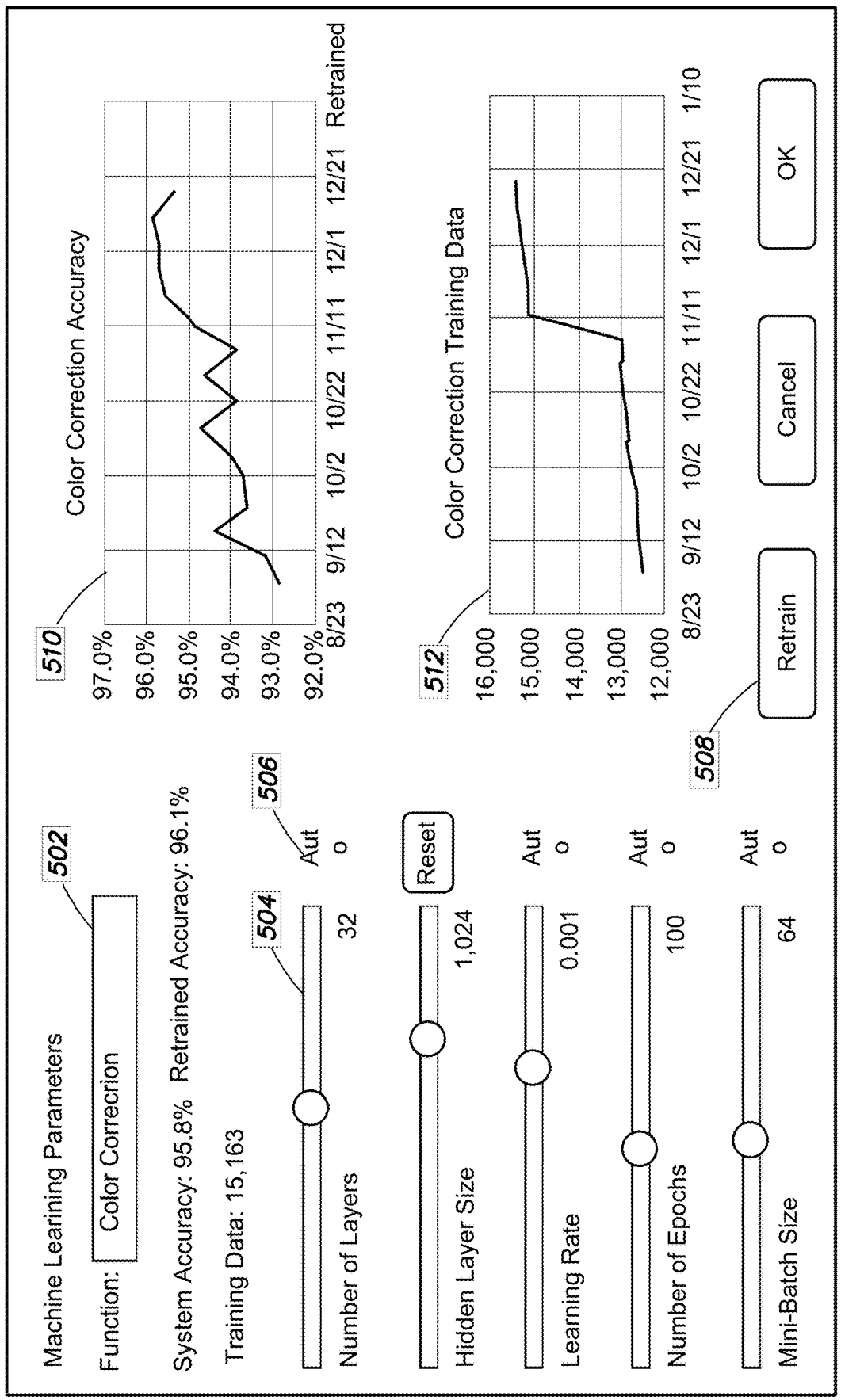
FIG. 5 is a diagrammatic illustration of a user interface enabling a user to adjust and monitor machine learning parameters of a user-adaptive machine learning-based content creation application.

To help the user manage issues such as local optimization and performance degradation during adaptive training, as well as to determine how the system is adapting to the local training data, users may be provided with the ability to adjust the hyperparameters manually, and to monitor the effect the adjustments have on the system's accuracy. When the user opts to allow the system to tune the hyperparameters automatically, it is desirable for the user to monitor the hyperparameter values adopted by the system, especially if the automatic tuning reduces the accuracy of the machine learning system. In this case, the user may intervene to override one or more automatically determined hyperparameter values. These capabilities may be provided by means of a user interface within the adaptive media content creation application such as user interface 500 illustrated by FIG. 5. In some implementations in which the training is conducted externally to the content creation application, the machine learning parameter control interface is part of the external application that manages the training of the neural network model, such as deep learning system 308 shown in FIG. 3. Users choose the function of the application to which the user-adaptive machine learning is to be applied in box 502. Interactive controls for each hyperparameter enable the user to adjust their values manually, for example with mouse or touch-controlled slider 504 or to allow the system to determine the value automatically 506. If the user manually overrides the automatically tuned value of a hyperparameter to attempt to increase the system accuracy, its value is held constant during the training even if values of other hyperparameters change as a result of automatic tuning.

Controls are provided for each of the deep learning system's main hyperparameters. In the user interface illustrated in FIG. 5, the user is able to manually control or select automatic control for: (i) the number of hidden neural network layers between the input and output layers; (ii) the hidden layer size, defined as the number of neurons in each of the hidden layers; (iii) the learning rate, which controls the extent to which newly acquired information overrides old information; (iv) the number of epochs, which is the number of times the system processes the entire set of training data when it is retrained; and (v) the mini-batch size, which refers to the number of instances of training data used before the model parameters are updated during training. The current value if each hyperparameter is displayed, enabling the user to check that the parameter values are in the normal range, which generally corresponds a value closer to the middle than to a maximum or minimum the range of possible values. The user is able to decide whether to keep the new hyperparameters, or further adjust the hyperparameters and perform additional retraining and testing.

A further type of hyperparameter defining the size of an input vector comprising a raw media sample may be used when training models for automatic editing of media compositions. In media applications, the inputs for both training and production may include digital media samples. Audio samples may be sampled at 22 kHz, represented as 22,000 16-bit numbers per second. Video samples may be represented as a color histogram for each frame and/or portions of the raw video itself. Uncompressed video may consist of 1920×1080 pixels per frame, with each pixel represented by 8-bit R, G, B values, at 30 frames per second. The machine learning system uses a highly compressed portion of the raw video, such as, for each training instance, a single representative frame reduced to a resolution of 64×64 pixels, corresponding to an input sample size of 4,096×3=12,288 8-bit numbers. The size of the input vector determines the width of the neural network model, i.e., the number of neurons in each of the model's layers.

The size of a media sample input from a training data instance may be treated as a hyperparameter that is tuned to be as small as possible while achieving acceptable accuracy. For image data, the size of an input vector lies between 4,000 and 100,000 numbers depending on the function that is being trained. For example, color correction requires smaller input vectors because the outputs are overall color levels of the corrected image, which are usually applied statically for the duration of a video clip. On the other hand, feature detection requires larger input vector sizes because details in the input images are needed to enable the system to recognize objects depicted in the image. An automated tool may be used to perform this tuning. In one implementation, tuning of the input media sample size is performed iteratively, optimizing all hyperparameters that are tunable at the user site starting with a large input sample size, and then repeating the optimization for smaller and smaller sample sizes until the accuracy drops below a threshold of acceptability. For example, the optimization may be performed initially using representative images having a resolution of 256×256, and then reoptimized for image sizes of 128×128, 64×64, 32×32, etc., until the accuracy drops below 95%.

When the user selects retrain button 508, the system is retrained with the current hyperparameter settings and its accuracy as determined by the test vectors is shown. The user interface shown in FIG. 5 displays both a numerical percentage accuracy after the most recent retraining, as well as graph 510 showing the accuracy over time together with graph 512 representing the number of instances of training data (local and third-party) used in the training over the corresponding time span. By comparing the graphs, the user is able to see what effect the addition of training data has on the system accuracy. For example, the illustrated graphs show that the addition of about 2,000 training instances over a period of about a week before November 11 served to increase the accuracy from about 94% to about 95%, but that in the final week of training as still further data was added, the accuracy began to decline. The user may infer that though the addition of local training improved the accuracy up to a certain point, still further training resulted in overfitting of the model and a corresponding adverse impact on accuracy. The performance of the system is also dependent on the tuning of hyperparameters. In some implementations, the hyperparameter user interface includes a record of one or more hyperparameter value settings over time, giving the user a fuller picture of the factors affecting system accuracy.

Figure 6:
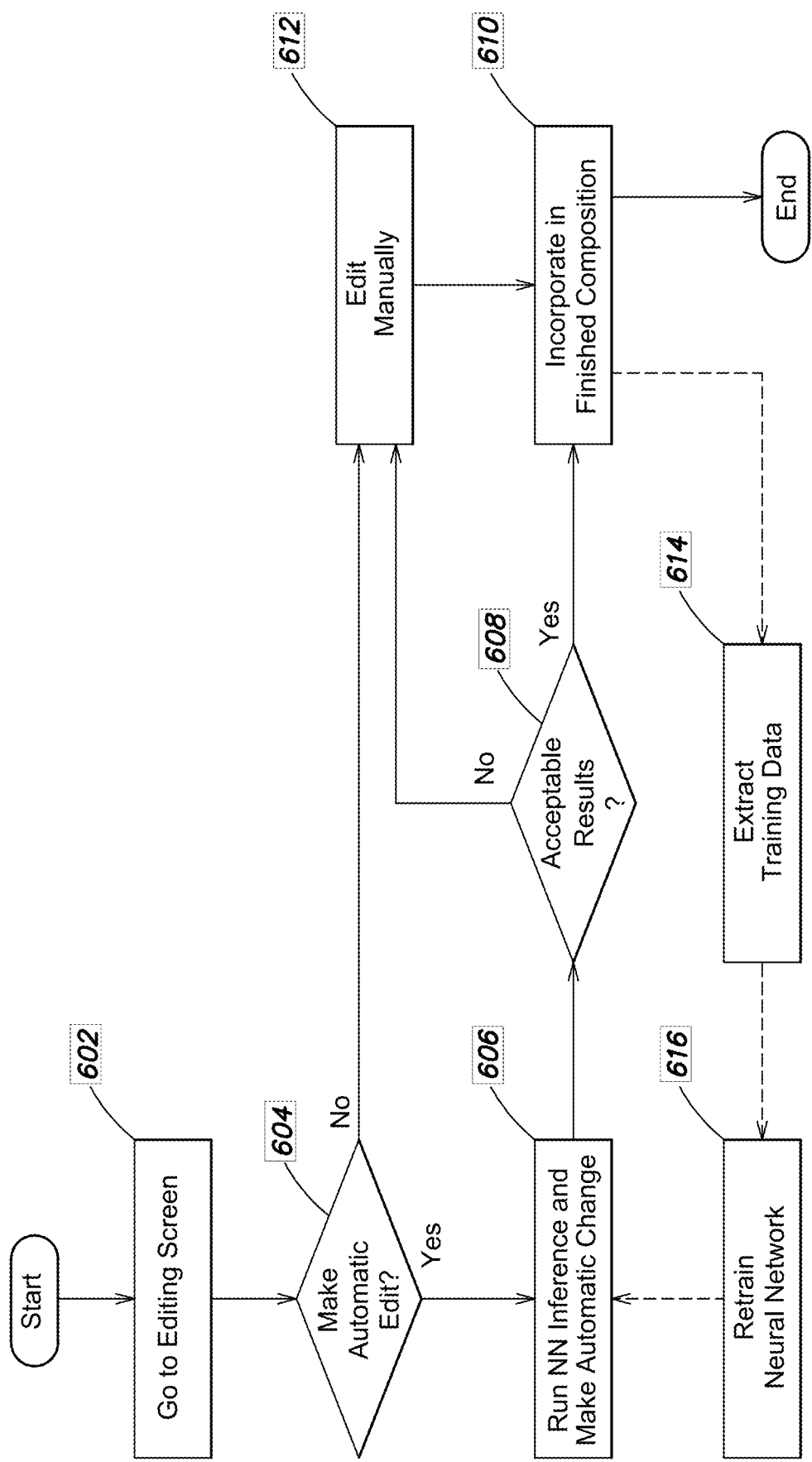
FIG. 6 is a high-level diagram of a workflow for performing deep-learning-based automatic editing of a media composition.

FIG. 6 is a high-level diagram of a workflow for performing deep-learning-based automatic editing of a media composition. A user of a media editing application with deep-learning enabled automatic editing functionality goes to an editing screen of the application (602) and decides whether to perform an automatic edit (604). If the user decides to perform an automatic edit, the application runs a neural network inference and performs an automatic change to the composition (606). The user may view the result and decide whether the automatic change is acceptable (608). If the results are accepted, the change is incorporated within the finished composition (610). If the user chooses not to invoke automatic editing or deems the results of the neural network inference to be unacceptable, the user is able to perform manual editing (612) and incorporate the manual changes into the finished composition (610). The finished composition is optionally used to improve the local adaptation of the automatic editing, in which case training data is extracted from it 614 and added to a local training data archive that may be used for neural network model retraining 616. The retrained model is made available to the media editing application for subsequent neural network inferences.

We now describe the application of the adaptive deep learning methods described herein to various examples of content creation functions that span video, audio, and musical scores. The application of the methods is not limited to these types of media product. Other examples include the synthesis of still imagery, stereo three-dimensional imagery, holograms, and media for augmented reality and virtual reality.

Four exemplary functions are described for video creation using a digital non-linear video editing system, such as Media Composer® from Avid® Technology, Inc., of Burlington, Massachusetts, with adaptive deep learning capabilities: color correction, audio mixing, dialog editing, and resolution upscaling.

Color correction is a function that nearly all video creation editors use to ensure that the various clips that comprise an edited composition have image parameters, such as color and brightness, that are consistent with each other. Color correction can be a time-consuming and exacting task, but it does not involve a significant amount of creativity, which makes it a good candidate for automation. The input training data for color correction are low resolution images of representative frames of the uncorrected source material. Examples of suitable resolutions of each image are 56×32, 112×64, or 224×128 pixels for red, green, and blue (RGB). In some implementations, the resolution of the input images is a tunable hyperparameter of the model. The size of the input images may depend on whether a fully connected neural network or a convolutional neural network is deployed, with the latter having a convolution layer following the input layer, which greatly reduces the size of the hidden layers of the neural network. Thus, while 256×256×3 represents a practical input image size for fully connected networks, much larger images may be handled when training a convolutional network. Additional training data inputs may include color histograms, waveforms, and vectorscope data for each input frame of video. The output training data are the values of color correction parameters, including but not limited to values for brightness, contrast, saturation, color offsets, and curve points for each of a red, green, blue, and master color curve. The color correction functions being automated may serve to correct color problems, such as brightness changes between two clips that depict the same scene. For some productions, editors give the finished result a particular look in which the color is corrected for aesthetic purposes. For example, a look may be applied in order to evoke a mood, such as a nostalgic, dreamy, high-tech, or brash mood. To train the adaptive system to generate such a look automatically, the training data comprises the low-resolution images of uncorrected media, and reference frames of the finished composition that have the desired look, with a separate set of training data for each of the looks for which the system is trained. Thus, the deep learning based color correction functions may include normal color correction, as well as one or more special look options, in which the automatically applied color parameters produce a finished composition characterized by the selected look.

When an adaptively trained video editing system encounters uncorrected frames for which the training data was sparse, the automatically generated results may be suboptimal, in which case the user may perform adjustments. These adjustments, together with the input frame may be added to the local composition archive to help fill out the training data.

Figure 7:
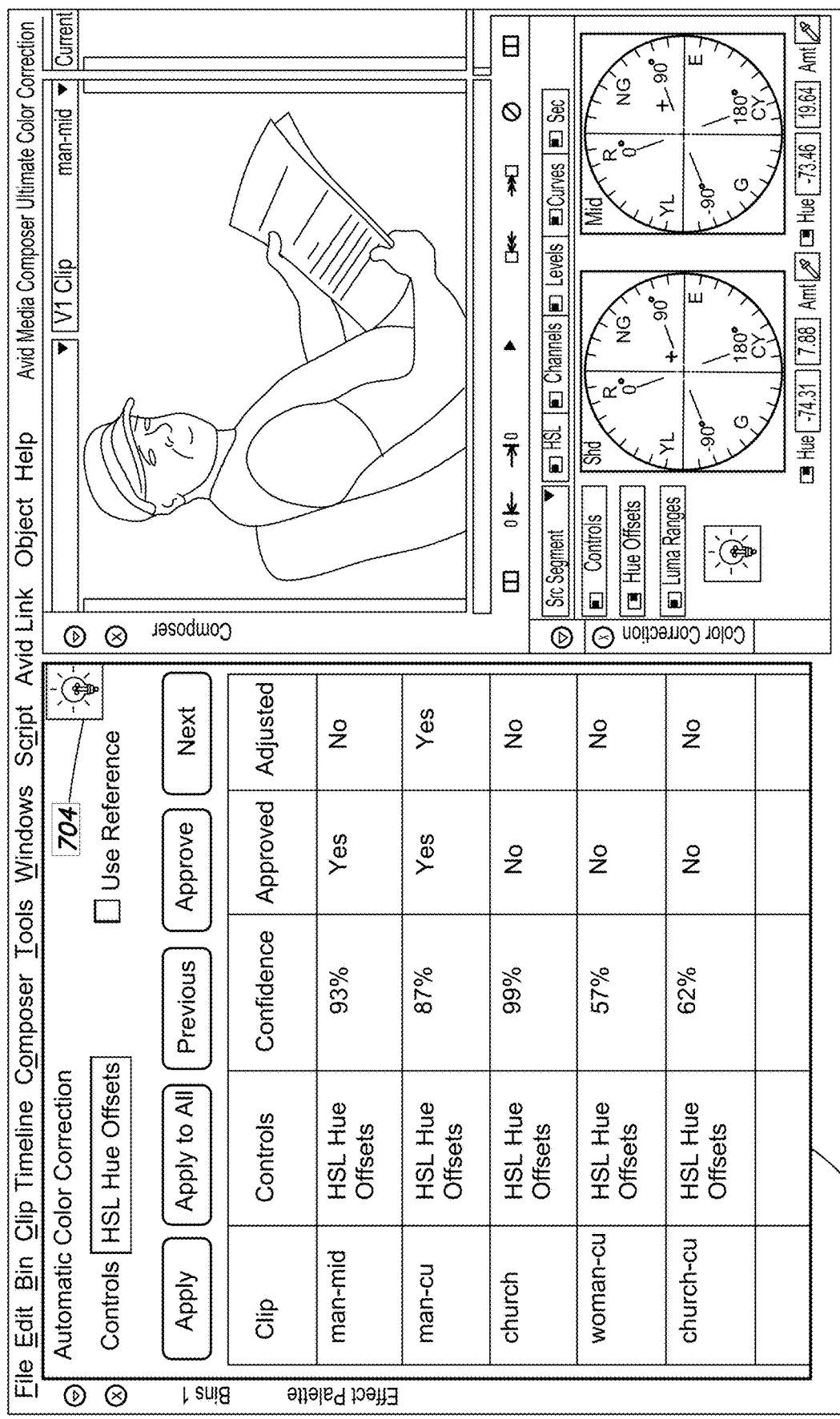
FIG. 7 illustrates the integration of machine-learning-based automatic color correction within a user interface of a non-linear video editing application.

When the user enables the adaptive deep learning content creation functions and selects a particular function or task to be performed automatically, a window offering user controls tailored to the application and function is displayed. FIG. 7 illustrates the integration of automatic color correction options 702 into user interface 700 of a non-linear video editing application. The deep learning-based option for the currently selected function may be invoked by a user control, such a light bulb button 704. The user is able to apply automatic color correction to an individual clip, for example by selecting one of the clips listed in a displayed clip list and selecting "apply," or invoke automatic color correction for the entire sequence of clips by selecting "apply to all."

When using a neural network model to generate color correction parameters, the inference step may be performed multiple times, each time with a different representative sample from the raw media input. An average of the values of the color correction parameters inferred for each representative sample may be used to generate the final color correction parameter values. The spread of the set of inferred color correction parameters may be used to provide a confidence level that a single inference of a static adjustment to time-based media, such as color correction, is acceptable for all parts of the input media of a given composition. This confidence level indicates the degree to which the subsampling of the raw media, i.e., the input to the model, is representative of the composition as a whole. The system may also display a different type of confidence level which indicates the degree to which the neural network model has been trained to produce consistent and predictable results. We describe methods of obtaining the confidence levels below. The user is able to adjust the automatically generated results, and when satisfied, may approve the color correction for incorporation into the final composition. The correction parameters generated by the deep learning system are shown in the interface, for example by the orientation of the four color wheels displayed below the clip display windows and in the numerical values of the hue offsets displayed in the boxes below each of the shadow, mid-tone, highlight, and master color correction wheels.

The editing function for generating a rough audio mix for a video composition is automated using the described adaptive training methods by providing as training inputs representative audio samples of each of the stems that form part of the audio mix. The automatic determination of the mix parameters using a trained neural network model may be performed multiple times using different representative audio samples from the raw media randomly selected from different places within the composition. The inferred mix parameters may vary between the multiple runs, and the parameter values used to generate the rough mix may be an average of the values obtained for each of the separate inference runs. Generating a rough audio mix without including the video corresponding to the audio is described in more detail below in connection with automating the generation of rough mixes using a digital audio workstation. For video compositions, it may be desirable to include video data as well as audio data in the training, since the audio editing decisions for audio tracks of a video composition may be affected by whether a particular audio source is shown on the screen. For example, an editor may choose the volume of an actor's voice to be louder when the actor is on-screen. An exception occurs when a group interview is being conducted, and the video cuts between the various participants. In this case, the gains of all the participants are usually equal in the rough mix. The distinction between these scenarios may be learned by the adaptively trained neural network model trained with input vectors including both representative audio samples and corresponding, i.e., co-temporal video frame pairs. The representative audio sample/video frame pairs may be chosen from a variety of temporal offsets within a composition. For feature films, which are broken down into reels and screens, the sampling and the model training is performed separately for each subsection. Sampling within 1-5 seconds of the beginning or end is avoided in case these portions contain test patterns or title screens.

Dialog editing for video programs is another function performed by a non-linear video editing application using the described adaptive deep learning methods. When editing scripted material for television or movies, the on-set shooting commonly includes multiple takes that are captured sequentially, sometimes without stopping and restarting the recording between takes. The result may be one or more dailies that are reviewed by assistant editors searching for the best take. This process may require searching through several hours of material to identify and select material lasting minutes or less. Editors generally search for takes in which the on-set performance corresponds at least approximately to the script, even if some were altered, especially when the words substituted by an actor have similar meanings to the scripted words. In addition, their selection of the mark-in and mark-out points is affected by the pacing and content of the material, as well as by the style of the program's director.

The training data inputs for automatic dialog editing include, for each instance, the script, the audio from the dailies, and optionally the corresponding video. Each input vector corresponds to a particular scene, and comprises the scene's script, audio samples that are representative of the corresponding spoken dialog, and optionally samples of the co-temporal video. Output vectors include the take selection performed by editors, i.e., the mark-in and mark-out timecodes of the dialog from a particular take chosen by the editor from among multiple recorded takes. A deep learning model trained with instances drawn from a range of content types, such as documentaries, action movies, and historical dramas and directed by a range of directors having differing styles is able to produce automatic dialog decisions that are appropriate to the content. When adaptive training using data from the user is incorporated into the model training, the system adapts to the style and preferences of the user, such as whether tight, rapid exchanges are favored as opposed to slower-paced cutting that enables the viewer to see a speaker before their spoken dialog beings.

In the production phase, the automatic dialog editing provides a confidence level for each block of dialog. The operator is able to scan the results and devote attention to those with poor confidence levels.

Intelligent upscaling of video resolution is another application of the described adaptive deep learning system. In this case, the training vectors do not need to include any parameter values or choices made by human operators. Instead, the input vectors comprise low resolution video or film, and the output vectors contain the high resolution output. The training data set inputs are artificially generated by downsampling original high-resolution frames. Images representing diverse kinds of content from a wide range of domains are included in the training data set, such as footage from movies, TV shows, documentary footage, and news. Frames represented in a range of color models are included in the training data, such as YCbCr, RGB, and CMYK, as well images represented by different encoding schemes such as 4:4:4 R'G'B' and 4:2:2 Y'CbCr. Adaptive training may be used to improve accuracy in the content domains in which the work of a given editor is concentrated. Local training data may be obtained from randomly selected full-resolution images in a final composition created by a local user, with the corresponding synthetic input obtained by downscaling these images. The neural network model is then trained to upscale from the synthetically generated downscaled images to the original image. In production mode, low-resolution imagery is input, and the system automatically generates high-resolution output. In a typical use mode, no further adjustments are made by the user. Similar methods may be used to perform intelligent upscaling of audio quality.

We now describe some examples of adaptive deep learning methods to the composition and editing of audio using a DAW: generating a rough mix, noise reduction, equalization, and the sequencing of audio effects chains. An example of a DAW is Pro Tools®, from Avid Technology, Inc. Audio editors often make rough mixes in order to reduce the time needed in an expensive recording studio where the final mix is created. In creating a rough mix, editors adjust the gain levels of each of the contributing sources. Training data input vectors for a rough mixing deep learning model include representative samples from the dry stems. For example, the inputs for creating a rough audio mix of a song would be representative samples of each of the instruments and the vocals. Optionally, the inputs also include the input sample volumes, and a frequency map (Fourier transform) of the samples. The training data output vectors are the editor-specified value of the gain levels (e.g., in decibels) for each of the sources. Each representative input portion corresponds to between 1 second and 10 seconds of playback time of the source. The size of an instance of an input training vector depends on the audio sampling rate, the number of channels sampled, the number of representative samples, and the duration of each representative portion. As an example, 3 representative portions of 1 second each from each of 4 channels of audio sampled at 48 kHz corresponds to an input vector size of 3×1×4×49,152, i.e., 589,824. The portion of the raw stems chosen as representative of the whole piece depends on the form of the music. For example, in some songs, it may be the opening melody and a chorus. In various implementations, the system picks the representative portion automatically. Music represented as (Musical Instrument Digital Interface) MIDI tracks may be provided to train a model for rough mixing by providing an instrument code for each input, and individual or average note gain values.

The training data spans a variety of musical genres. In production mode, the user provides the raw stems, and the system generates a rough mix automatically. The user may adjust the automatically generated rough mix and allow these adjustments to be added to a local composition archive to be used for additional training. A confidence level is generated, and the user may use this as a guide as to whether adjustments are needed to override the automatic mix.

Figure 8:
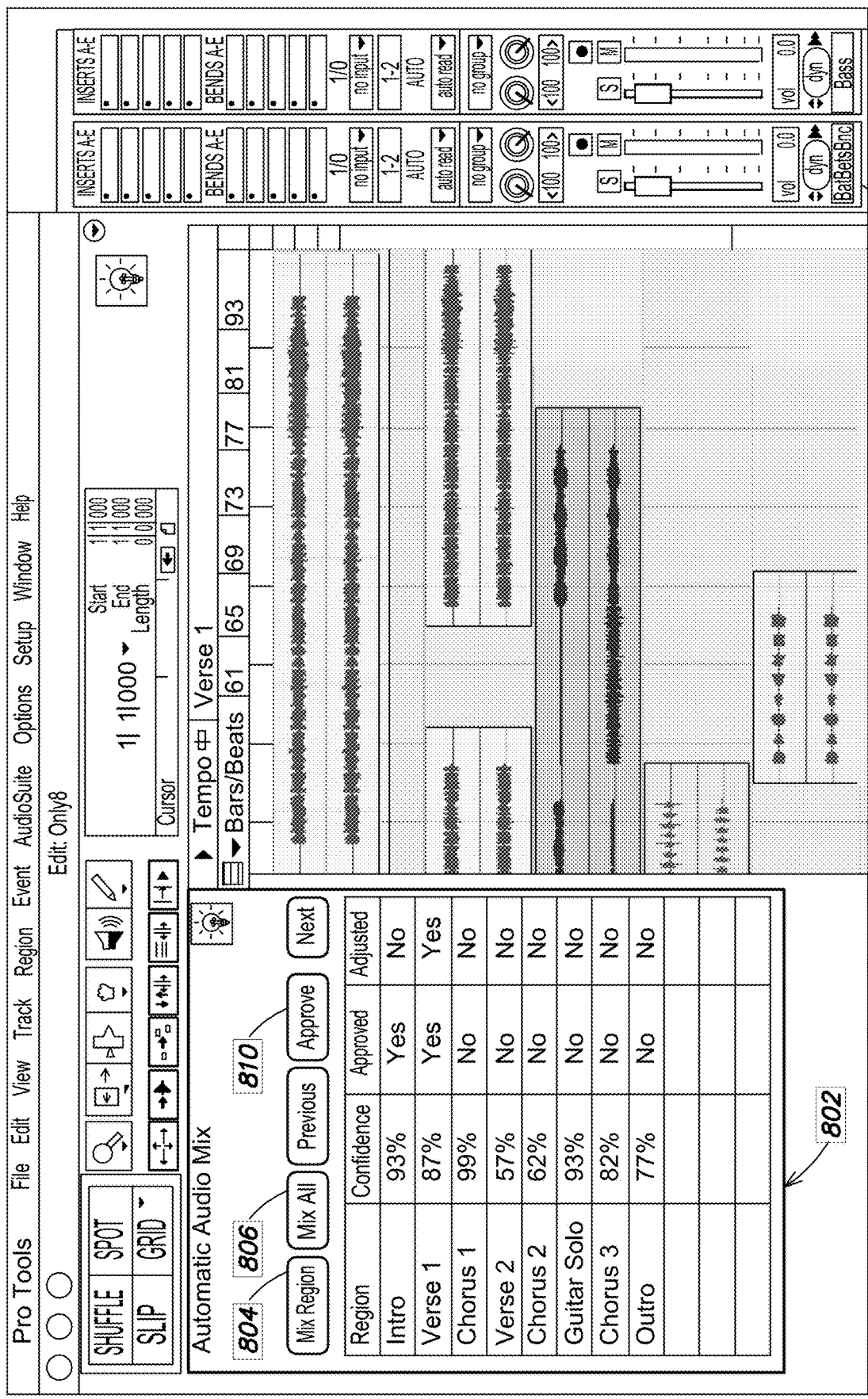
FIG. 8 illustrates a user interface of a digital audio workstation application that incorporates an adaptively trained model for generating rough audio mixes.

A user interface 800 of a DAW that incorporates an adaptively trained model for generating rough audio mixes is illustrated in FIG. 8. Automatic audio mix window 802 enables a user to specify whether a particular region of a composition is to be mixed automatically (804) or whether the entire composition is to be mixed (806). The user may adjust an automatically generated mix using the normal tools of the DAW, such as the controls in mix window 808, and indicate approval (810) when the rough mix is deemed satisfactory. Automatic audio mix window 802 lists each of the regions of the composition together with its approval status and whether the region's mix has been manually adjusted. A confidence level is also listed to provide a measure of the mixing accuracy of each region.

In a second application of adaptive deep learning to audio editing, automatic noise reduction is performed. In current workflows, editors manually specify locations within an audio composition where music is present and where music is not present. Any sound in the latter locations is attributed to noise. The noise reduction training data set comprises inputs of the user-specified silence locations, user-specified locations that include music as well as any noise present in the silent locations. The training data set outputs include the noise-reduction parameters generated by a combination of an automatic noise-reduction performed by a third party plug-in module, and an editor-specified adjustment to parameters generated by the plug-in. Local training by users of DAWs using noise reduction is beneficial because, even though noise is often an unwanted distraction, it may be a desired signal in certain circumstances. For example, a reporter visiting a factory or an airport may wish to include the noise generated by a factory machine or a passing airplane. In the production mode, the system searches for a silent portion of the input composition. In some implementations, this is done by sliding a fixed duration window across an audio clip. Thus, for example, a 1 second window used on a 60 second clip generated 60 results. The trained system automatically identifies the window that most closely resembles silence. In a second step, randomly selected samples are provided to the system which automatically generates the noise reduction parameters.

The described deep learning methods may also be used to perform automatic equalization (EQ). The training data inputs comprise the raw input samples, and the outputs comprise the EQ settings for a given EQ plug-in module choice, such as multi-band EQ or parametric EQ, with a different model trained for each plug-in. Alternatively, the output training data may include as a parameter the type of EQ selected by an editor, along with the parameters for the selected EQ type. This trains the model to infer whether particular input samples are preferably equalized using multi-band EQ or parametric EQ, or indeed without any EQ applied at all.

Another application of the adaptive deep learning methods is the optimization of the order in which audio effects chains are applied. Many audio effects are lossy, and the results depend on the order in which they are applied. For example, the compressor limiter and the reverb effects are not commutative. Since there are many different effects, the number of possible chains, even for a given selection of effects, may be large. Each effect is added for a specific purpose, which depends on the nature of the signal to which it is applied. A neural net is used to glean knowledge from expert users and, when encapsulated in a trained model, made available to non-expert users.

Score-writer applications are used by composers and arrangers of music to create sheet music in electronic or paper form. An example of such a music notation program is Sibelius® from Avid Technology, Inc. We describe three exemplary applications of adaptive deep learning methods to score-writer applications: score layout optimization, harmonization, and generating variations on a theme. In laying out a score, skilled engravers choose where to place each of the many symbols and notations, such as a note, clef, stave, or text object, that appear on a musical score. While procedural methods are able to generate acceptable layouts, as described, for example in U.S. Pat. No. 8,093,481 entitled "Systems and Methods for Automatic Collision Avoidance, Grouping and Alignment of Musical Symbols," which is wholly incorporated herein by reference, deep-learning-based methods are able to learn from expert engravers and improve on algorithmically generated layouts.

The training data inputs for automatic musical score layout comprise the X, Y positions of each of a number of items on a score generated algorithmically or by a human novice together with an index defining the type of symbol or mark. The outputs comprise the adjustments in X and Y positions of the objects specified by an expert. The X, Y positions may be defined in terms of a box that bounds each symbol. Since each score may have a different number of symbols, an input vector may be padded with place-holder values up to a standard size, e.g., 512 elements, to make the input vectors uniform in size.

Local training data inputs and outputs are of the same type as those from expert or other third party training data. Users that have a particular score layout style of their own may wish to add their own training data to a pre-trained system. Other users may be content with the automatic layouts generated by the expert-trained model, obviating the need for local training.

Figure 9:
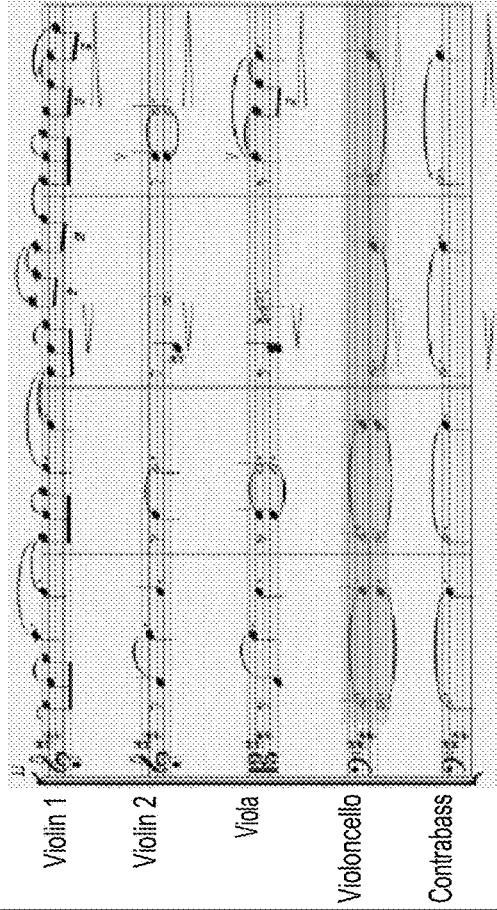
FIG. 9 illustrates a user interface for a score-writer application with an adaptively trained model for automatic arrangement and harmonization of musical parts within musical scores.

Training data inputs for the task of harmonizing musical scores comprise a number of parts of a musical composition, and the outputs are additional parts in harmony with the input parts. For example, an input vector may comprise guitar chords and a singer, and the output vector may include parts of drums, bass, and a harmony vocal line. While the number of parts in the inputs and outputs may vary, the training data inputs include a main melody and the outputs include at least one additional part that accompanies the main melody. In some applications, the training data inputs include all the parts for a small ensemble, and the outputs comprise a rearrangement of all the parts for a larger ensemble, and vice-versa. The user adds local training data through their own arrangements of one or both of their own compositions and those of others. User interface 900 for a score-writer application with deep learning-based adaptive automatic arrangement and harmonization of musical scores is shown in FIG. 9. Automatic part creation window 902 enables a user to specify (904) a part to be created, and whether to create the new part for a selected section of a composition or for the entire composition. The user is able to make further adjustments after the part is automatically created, and then approve the new part. A confidence score for each of the automatically generated parts is displayed.

In another application of the described methods to score writing, a deep learning-based system generates variations on a theme. Training data comprises themes as inputs and their variations as outputs. To obtain a large enough training data set, an expert system that can discriminate between themes and their variations extracts themes and variations from a corpus of music. Such expert systems use methods for determining measures of similarity between different pieces of music, such as those described in "Learning Similarity Metrics for Melody Retrieval" by Karsdorp, Kranenburg, and Manjavacas, 20$^{th}$ International Society for Music Information Retrieval Conference, Delft. The Netherlands, 2019, and "Melody Retrieval Using the Implication/Realization Model," Grachten, M., Arcos, J.-L. and de Mantaras, R.-L.; Melody Retrieval using the Implication/Realization Model, Proc. MIREX 2005 Symbolic Melodic Similarity Results, 2005, both of which are wholly incorporated herein by reference.

It is desirable to generate a confidence level for each automatically generated media editing function. When multiple such automatic edits are available as alternatives to each other for a particular application and function, a user may use the confidence level to pick one of them—i.e., the one with the highest confidence level. In situations where the AI-based system is used to generate edits for each of multiple segments of a composition, e.g., for each section of a musical composition, but where only a single editing result is generated for each segment, the user may approve edits having an acceptable confidence level, such as any level above a threshold confidence level, and focus attention on reviewing and adjusting those edits with unacceptable confidence levels, such as those below the threshold.

As indicated above in connection with the automatic generation of color correction parameter values, two kinds of confidence level may be determined for inferences in which the input has been subsampled. The first applies only to neural network-based inferences in which the input has been subsampled and a single inferred result is be applied statically across the entire composition. The confidence level indicates the degree to which the single result works satisfactorily for all parts of the composition. Such a confidence level may be obtained by running inferences with the trained neural network model on multiple different representative portions of the input media for the composition. The degree of variation among the editing function parameters inferred by the neural network model may be used as a measure of this confidence. The second type of confidence level applies to all neural network-based inferences including those for which the media inputs are not subsampled and measures the degree of confidence in the trained model itself, i.e., whether the training of the model has been sufficient to produce consistent and predictable results.

Various methods may be used to generate the second type of confidence level, i.e., a confidence level that assesses the reliability of the neural network model. In the clustering method, a new input, i.e., an input for an application in which an automatically generated editing function parameter value is to be inferred, is notionally plotted as a point in a multidimensional space that includes some or all of the inputs, both from the third-party pre-training and, if available, from local training data that has been used to train the model being used. A "distance" metric is computed as a measure of how far the new input is from the training data. A smaller distance, implying that it falls within or near a cluster of training data, indicates a higher confidence level, while a larger distance that indicates a position outside a training data cluster indicates lower confidence. This distance measures the degree of similarity of the new input with the training inputs, and the confidence level assumes that the greater this similarity, the better the model performs. The clustering method of generating confidence levels is described in "A Generalized Approach to Determine Confident Samples for Deep Neural Networks on Unseen Data," by Zhang, Leung, Ma, Wen, and Avinash, in Uncertainty for Safe Utilization of Machine Learning in Medical Imaging and Clinical Image-Based Procedures, eds., Greenspan, Tanno, Erdt et al. 2019, which is wholly incorporated herein by reference.

A second method of determining confidence in a trained neural network model is the dropout method, which is adapted from a similar method used to hinder over-training during the training phase, and is described in an article entitled "Dropout as a Bayesian Approximation: Representing Model Uncertainty in Deep Learning," by Gal and Ghahramani, Proceedings of the $33^{rd}$ International Conference on Machine Learning, New York, which is wholly incorporated herein by reference. To obtain a confidence level, the model is run multiple times for a given input, and for each run a different random set of neurons in the neural net model is disabled. The multiple results are analyzed, and a confidence level is derived from their spread, with a higher confidence level being assigned to a lower spread among the results.

In certain implementations, a single confidence level that considers both the subsampling confidence and the model confidence levels may be provided to a user. In such implementations, multiple inferences are run for a given editing application and editing function on a single composition by varying both the selection of input sample portions and performing a model confidence test, such as the clustering or dropout method.

The various components of the automatic media editing and content creation system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An media editing method comprising:
providing a computer-implemented media editing application that is able to edit media to generate an edited media composition, wherein:
the editing comprises generating a value of a parameter that defines an editing function that is applied to the media;
the editing is based on a trained third-party neural network model for the editing function, wherein the third-party neural network model was trained using a third-party training data set comprising, for each media composition of a plurality of media compositions edited by one or more third-party editors:
an input vector comprising representative media extracted from media that was previously edited by the one or more third-party editors; and
an output vector comprising a value specified by the one or more third-party editors of the parameter defining the editing function that was applied to the media during the previous editing;
training a user-adapted neural network model based on a combination of the third-party training data set and a user-generated training data set, wherein:
the user-generated training data set comprises, for each media composition of a plurality of media compositions previously edited by a user of the media editing application:
an input vector comprising representative media extracted from media that was previously edited by the user; and
an output vector comprising a value specified by the user of the parameter defining the editing function that was applied to the media during the editing by the user; and the media editing application:
receiving production media;
extracting representative production media from the received production media;
inputting the representative production media to the trained user-adaptive neural network model to generate an output value of the parameter defining the editing function to be applied to the production media; and
applying the editing function as defined by the generated value of the parameter to the production media to generate a production edited media composition.

2. The method of claim 1, wherein the plurality of media compositions previously edited by the user of the media editing application includes a media composition for which the user specified a value of the parameter defining the editing function by adjusting a value of the parameter that was previously generated by the media editing application.

3. The method of claim 1, wherein the production edited media composition is a video composition and the production media content includes a video clip.

4. The method of claim 3, wherein the production representative media comprises low resolution versions of selected frames of the video clip.

5. The method of claim 3, wherein the editing function comprises color correction.

6. The method of claim 3, wherein the media comprises a plurality of recordings of multiple on-set takes of spoken dialog corresponding to a script, and the editing function comprises selecting a temporal span within the media corresponding to an optimal on-set take.

7. The method of claim 1, wherein the production edited media composition is an audio composition and the representative production media comprises one or more short duration portions of each of a plurality of audio sources.

8. The method of claim 7, wherein the editing function comprises generating a rough audio mix and the parameter defining the editing function to be applied is a gain level for one of the plurality of audio sources.

9. The method of claim 7, wherein the editing function comprises noise reduction.

10. The method of claim 7, wherein the editing function comprises equalization.

11. The method of claim 1, wherein:
the production edited media composition is a musical score;
the representative production media comprises spatial coordinates of each of a plurality of score symbols; and
the editing function comprises score layout optimization.

12. The method of claim 1, wherein
the production edited media composition is a musical score;
the representative production media comprises one or more musical parts of the musical score; and
the editing function comprises generation of a new musical part that is harmonized to the one or more parts of the musical score.

13. The method of claim 1, wherein the user-generated training data set further comprises a plurality of training instances obtained from a plurality of media compositions edited by users of the media editing application other than the first-mentioned user.

14. The method of claim 1, wherein generating a trained user-adapted neural network model comprises:
randomly assigning each instance of the third-party training data set to one of a training data set, a validation data set, and a test data set;

randomly assigning each instance of the user-generated training data set to one of the training data set, the validation data set, and the test data set;

training the user-adapted neural network model with the training data set;

validating the user-adapted neural network model with the validation data set; and testing the user-adapted neural network model with the test data set.

15. The method of claim 1, wherein training the user-adapted neural network model comprises:

transferring weights of a given number of layers of neurons of the trained third-party neural network model to initialize weights for the given number of layers of the user-adapted neural network;

randomly initializing weights of one or more layers of the user-adapted neural network model that are not initialized with weights transferred from the trained third-party neural network model; and training the user-adapted neural network model with the user-generated training data set.

16. The method of claim 15, wherein the transferred weights are frozen during the training.

17. The method of claim 15, wherein the transferred weights are adjusted during training.

18. The method of claim 1, wherein an integrated user interface of the media editing application for performing the editing function on a media composition includes user controls for automatic editing of the function and user controls for manual editing of the function.

19. The method of claim 1, wherein the representative media of the user-generated training data set is extracted by a training data extraction application operating in conjunction with a plug-in software module that is able to read a media composition represented by a compositional data model specific to the media editing application.

20. The method of claim 1, wherein the user-adapted neural network model is defined by a plurality of hyperparameters, and a user interface of a training application used to train the user-adapted neural network model enables a user of the training application to specify, for each hyperparameter of the plurality of hyperparameters whether the hyperparameter is adjusted by the training application or is manually adjusted.

21. The method of claim 1, wherein a user interface of a training application used to train the user-adapted neural network model displays an indication of an accuracy of the generated value for the parameter defining the editing function.

22. The method of claim 1, wherein a hyperparameter of the user-adapted neural network model is a size of the input vector comprising representative media extracted from media that was previously edited by the user.

23. The method of claim 22, wherein a value of the hyperparameter is automatically determined during training of the user-adapted neural network model.

24. A computer program product comprising:

a non-transitory computer-readable medium with computer-readable instructions encoded thereon, wherein the computer-readable instructions, when processed by a processing device instruct the processing device to perform a media editing method comprising:

providing a computer-implemented media editing application that is able to edit media to generate an edited media composition, wherein:

the editing comprises generating a value of a parameter that defines an editing function that is applied to the media;

the editing is based on a trained third-party neural network model for the editing function, wherein the third-party neural network model was trained using a third-party training data set comprising, for each media composition of a plurality of media compositions edited by one or more third-party editors:

an input vector comprising representative media extracted from media that was previously edited by the one or more third-party editors; and an output vector comprising a value specified by the one or more third-party editors of the parameter defining the editing function that was applied to the media during the previous editing;

training a user-adapted neural network model based on a combination of the third-party training data set and a user-generated training data set, wherein:

the user-generated training data set comprises, for each media composition of a plurality of media compositions previously edited by a user of the media editing application:

an input vector comprising representative media extracted from media that was previously edited by the user; and an output vector comprising a value specified by the user of the parameter defining the editing function that was applied to the media during the editing by the user; and the media editing application:

receiving production media;

extracting production representative media from the production media;

inputting the production representative media to the trained user-adaptive neural network model to generate an output value of the parameter defining the editing function to be applied to the production media; and applying the editing function as defined by the generated value of the parameter to the production media to generate a production edited media composition.

25. A system comprising:

a memory for storing computer-readable instructions; and a processor connected to the memory, wherein the processor, when executing the computer-readable instructions, causes the system to perform a media editing method comprising:

providing a computer-implemented media editing application that is able to edit media to generate an edited media composition, wherein:

the editing comprises generating a value of a parameter that defines an editing function that is applied to the media;

the editing is based on a trained third-party neural network model for the editing function, wherein the third-party neural network model was trained using a third-party training data set comprising, for each media composition of a plurality of media compositions edited by one or more third-party editors:

an input vector comprising representative media extracted from media that was previously edited by the one or more third-party editors; and an output vector comprising a value specified by the one or more third-party editors of the parameter defining the editing function that was applied to the media during the previous editing;

training a user-adapted neural network model based on a combination of the third-party training data set and a user-generated training data set, wherein:

the user-generated training data set comprises, for each media composition of a plurality of media compositions previously edited by a user of the media editing application:

an input vector comprising representative media extracted from media that was previously edited by the user; and an output vector comprising a value specified by the user of the parameter defining the editing function that was applied to the media during the editing by the user; and the media editing application:

receiving production media;

extracting production representative media from the production media;

inputting the production representative media to the trained user-adaptive neural network model to generate an output value of the parameter defining the editing function to be applied to the production media; and applying the editing function as defined by the generated value of the parameter to the production media to generate a production edited media composition.

\* \* \* \* \*